C. WOLTERS & I. RUDIGIER.
Apparatus for Improving Liquors.

No. 138,776. Patented May 13, 1873.

UNITED STATES PATENT OFFICE.

CHARLES WOLTERS AND IGNAZ RUDIGIER, OF PITTSBURG, PENNSYLVANIA.

IMPROVEMENT IN APPARATUS FOR IMPROVING LIQUORS.

Specification forming part of Letters Patent No. 138,776, dated May 13, 1873; application filed September 5, 1872.

*To all whom it may concern:*

Be it known that we, CHARLES WOLTERS and IGNAZ RUDIGIER, both of the city of Pittsburg, Pennsylvania, have invented an Improved Apparatus for Improving New Whisky, Brandy, Gin, or any alcoholic liquors, of which the following is a specification:

We have invented the above-named apparatus jointly, and its improvement is upon two principal points of other inventions of like nature used in purifying newly made alcoholic liquors.

Our first improvement consists in arranging the combinations of our machinery in such a manner so as to obtain a natural draft or circulation of air through the liquors without the use of any additional machinery or air-pumps. Our second improvement consists in making a part of our apparatus in which the liquors are purified transparent, so that it will admit the transmission of light to the inside of the same, to act upon the liquors in producing the necessary chemical changes.

Figure 1:
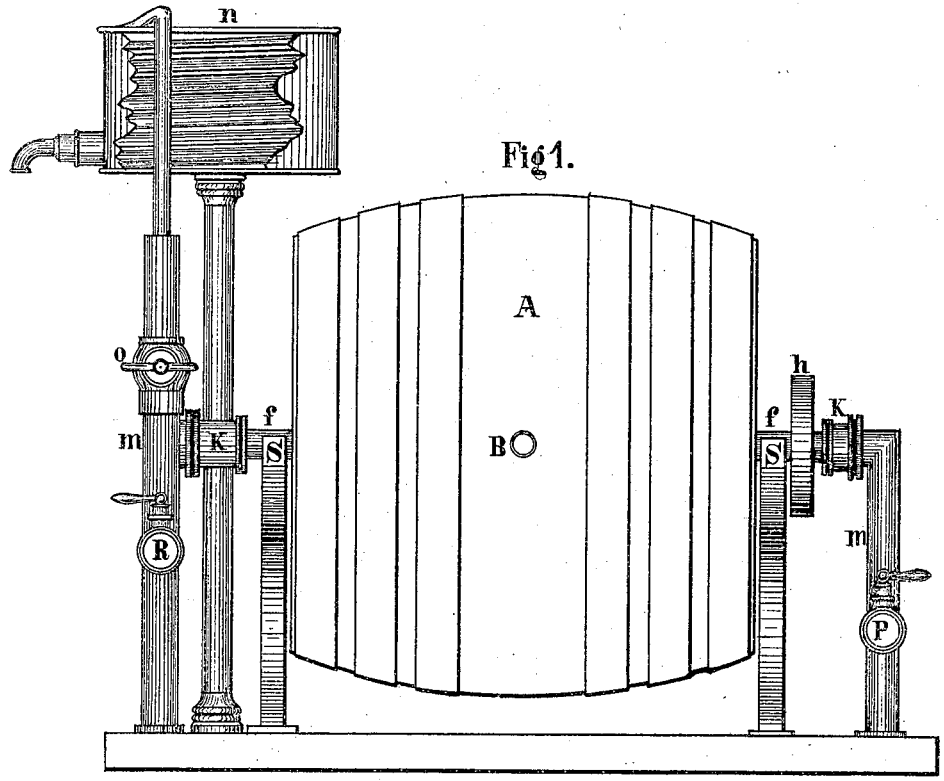
Figure 2:
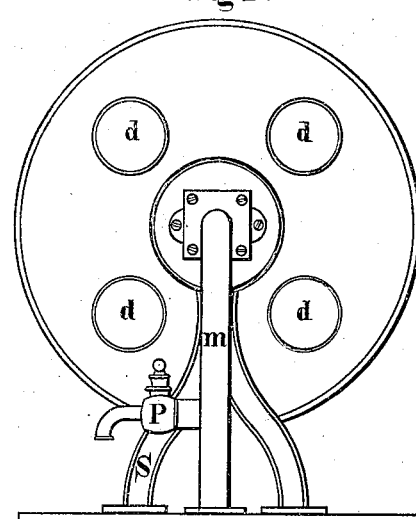

Figure 1 shows the construction of our apparatus in all its parts. Fig. 2 shows the heads of vessel A of said Fig. 1.

Vessel A, Fig. 1, is supported by two standards, letters S, as shown by said Figs. 1 and 2, and turns upon hollow axes fastened to the center of each head, which said axes are shown at letter F, and which said pipes form connections with pipes, letters m, and the worm of the condenser n, which said hollow axes F, in combination with the receiver A and the condenser n, cause a circulation of air through vessel A and said condenser n. At the heads of vessel A, Fig. 2, are made a number of glass openings, which said glass openings or any transparent substance can be made to adhere to the surfaces of said heads by many ways known in art.

In using our apparatus to purify alcoholic liquors, it is placed in any position to receive light. Vessel A is loosely packed with any porous substance, and is filled almost one-half full of liquors through bung-hole B, after which it is set in a rotating motion by any power attached to pulley H.

It will be observed that by our combined arrangement of pipes F, vessel A, and the worm of the condenser n, we produce a superior result over other inventions now in use for purifying alcoholic liquors, in being enabled thereby to obtain a natural draft, so to speak, without the use of any additional machinery or air-pumps.

Without said condenser n there would be no draft, but by our combination, in manner described, we are enabled not only to obtain a draft through vessel A, but also condense the alcoholic vapors to prevent a loss of the liquors. We are also enabled to increase the draft just in proportion as we increase the size and height of the worm of said condenser.

By our glass openings, Fig. 2, letter d, we obtain an induction of light which exerts a great influence upon liquors in aging and purifying them.

What we claim as our invention is—

1. The light-inducting glasses d, in combination with vessel A, when used in aging and purifying alcoholic liquors, constructed in the manner set forth and described.

2. Vessel A, in combination with the hollow axis F and worm of the condenser n, for the purpose to condense the alcoholic vapors, and to produce an air-current through the liquors without the use of an air-pump, when used in aging and purifying alcoholic liquors, constructed in the manner described.

CHARLES WOLTERS.
IGNAZ RUDIGIER.

Witnesses:
JOHN HABERMEHL,
JOSEPH WEHMANN.